E. R. CALTHROP.
SAFETY SPRING SLING PARTICULARLY ADAPTED FOR USE WITH PARACHUTES.
APPLICATION FILED JULY 31, 1918.
1,401,040.
Patented Dec. 20, 1921.
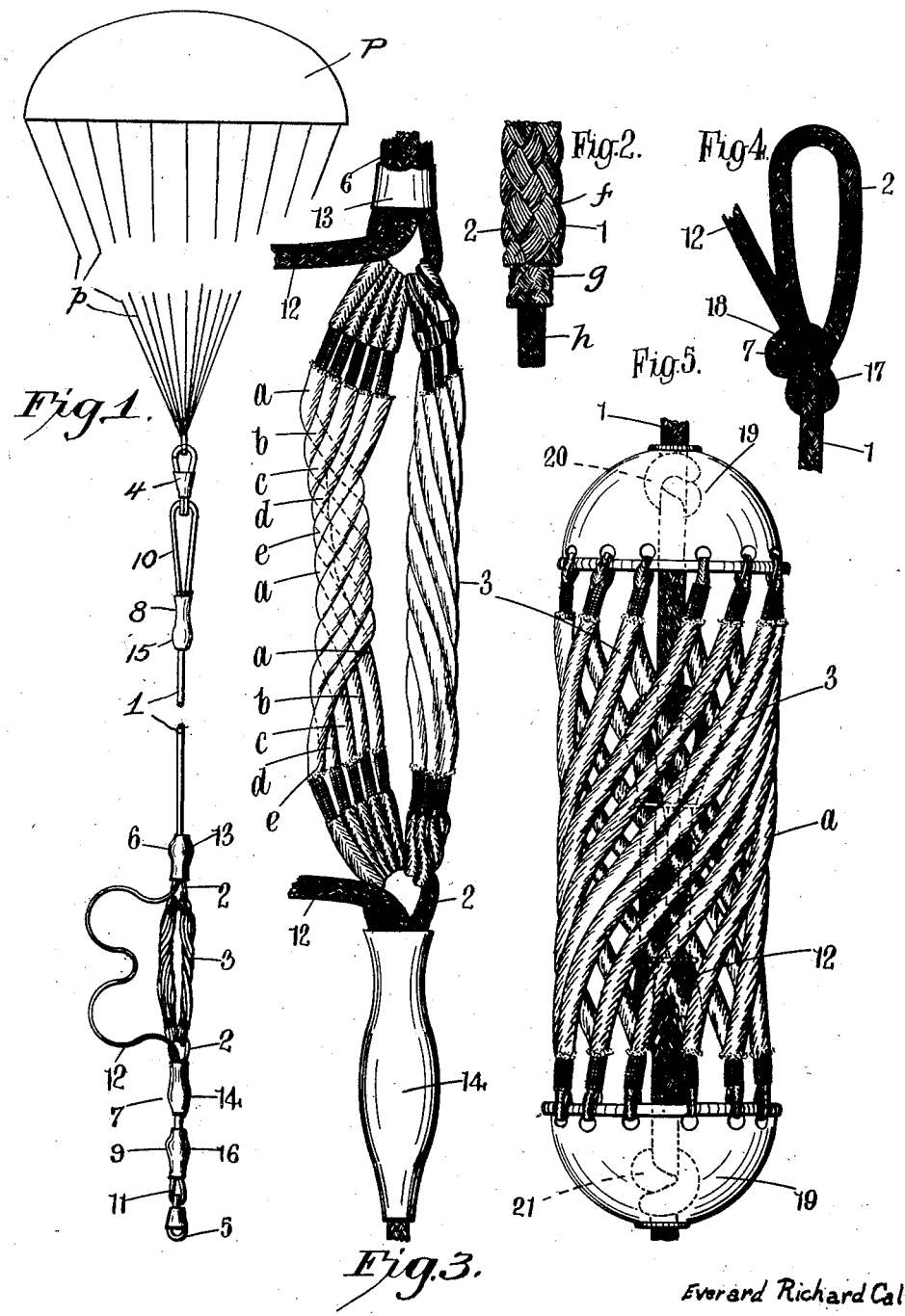
Everard Richard Calthrop
INVENTOR
Attorney

UNITED STATES PATENT OFFICE.

EVERARD RICHARD CALTHROP, OF LONDON, ENGLAND, ASSIGNOR TO E. R. CALTHROP'S AERIAL PATENTS LIMITED, OF LONDON, ENGLAND.

SAFETY SPRING-SLING PARTICULARLY ADAPTED FOR USE WITH PARACHUTES.

1,401,040.   Specification of Letters Patent.   Patented Dec. 20, 1921.

Application filed July 31, 1918. Serial No. 247,508.

(GRANTED UNDER THE PROVISIONS OF THE ACT OF MARCH 3, 1921, 41 STAT. L., 1313.)

*To all whom it may concern:*

Be it known that I, EVERARD RICHARD CALTHROP, a subject of the King of Great Britain, residing at London, in the county of Middlesex, England, have invented new and useful Improvements Relating to Safety Spring-Slings Particularly Adapted for use with Parachutes, (for which I have filed an application in England No. 8410, June 12, 1917,) of which the following is a specification.

This invention has reference to safety slings or suspension devices particularly adapted for use with parachutes same comprising a shock absorbing device for use by aviators when making a descent from an air craft by means of a parachute and consisting essentially of a resilient and extensible element mounted between the parachute and the passenger and an inextensible flexible element of greater length than the resilient and extensible element at rest.

Such a shock absorbing device possesses great advantages in use but when the same is partly composed of ordinary laid rope it has usually been found that in actual practice the aviator is liable to experience some discomfort due to the spinning or twisting of the aforesaid rope owing to the uncoiling and recoiling of the laid strands thereof.

Now the primary object of the present invention is to render the construction bereft of any bias or tendency to spin or twist in any direction when the weight or load is applied, and to simplify and generally improve the construction whereby the device is rendered more efficient for the ends in view.

According to this invention in order to effect the objects aimed at instead of employing ordinary laid rope a rope is used in which the fibers thereof are plaited or braided or this plaited rope may be tubular with one or more tubular plaited ropes each within the next or I may employ a plurality of lengths of diagonally woven webbing stitched together or again I may use two ordinary laid ropes connected together at intervals said ropes being preferably laid in opposite directions that is to say right and left hand laid ropes.

As is well known an ordinary rope readily lends itself to splicing and the necessary loops or eyes in the device are conveniently formed in that manner but it is not feasible to produce a satisfactory splice in a plaited or braided rope and when employing this material I contemplate forming the necessary eyes or loops by knotting the rope and I have found that the most satisfactory knot is that known as a "bowline" knot but even a knot of this character is liable when unloaded to slacken under vibration and shocks and to slip when strain is exerted upon it and I therefore employ means whereby in all circumstances the knot is kept taut. This is effected by providing a sleeve of suitable material such as rubber or the like which is passed over the knot and I have found that no matter what vibration shocks or varying strains the rope is subjected to a bowline knot so confined will remain taut.

The resilient and extensible element which is adapted to be placed in tension when the load is applied is constituted by a number of strands of rubber which are twisted together in opposing spirals in such a manner that the individual strands are not shortened so that when the composite element thus constituted is placed in tension an equal strain will be borne by each spiral and by each of the strands.

In order that the invention may be readily understood and carried into effect same will now be described more fully with reference to the accompanying drawings in which:

Figure 1 is a general view illustrating the complete safety spring sling attached to a parachute.

Fig. 2 illustrates diagrammatically the type of rope employed.

Fig. 3 is a view of the resilient and extensible element thereof detached and drawn to a larger scale the strands on one side being somewhat distorted from their normal position represented on the other side of the figure in order to show the arrangement of unshortened strands.

Fig. 4 is a view showing the form of knot known as a "bowline" knot used in constructing the eyes or loops for carrying the resilient and extensible element.

Fig. 5 represents a modified form of the resilient and extensible element of the improved sling.

In carrying out the invention the rope 1 which is preferably continuous so as to furnish the loops or yoke pieces 2.2. for carrying the stranded resilient and extensible element 3 is formed of plaited or braided strands of fiber hemp or other appropriate material and may be solid or it may as shown in Fig. 2 be constituted by a plurality of tubular portions *f*, *g* and a solid portion *h* one within the other. By using a rope of this construction the spinning or twisting incidental to the employment of the ordinary laid rope is entirely obviated. Instead of the plaited or braided form of rope a plurality of lengths of diagonally woven webbing stitched together may be employed or two ordinary oppositely laid ropes may be used same being connected together at intervals in their length. I have found, however that good results are insured by the employment of the plaited or braided form of rope above described and illustrated in the drawings.

In order to provide for the necessary eyes or loops for carrying the aforesaid resilient and extensible element 3 and the safety hooks 4, 5 for attachment respectively to the rigging *p* of the parachute P (not shown) and the aviator's harness (not shown) the said rope 1 is knotted into what are known as "bowline" knots. The knots 6, 7 furnish the eyes or loops 2, 2 for the ends of the element 3 while the knots 8, 9 furnish the loops 10, 11 for the safety hooks 4, 5 respectively. The portion 12 of the rope between the knots 6, 7 serves as a safety rope in the event of the element 3 breaking from any cause whereupon it will automatically operate to take the weight of the passenger and prevent him falling to the ground. When employing a knotted rope such as above described it is essential that there should be no slackening or slipping of the knots either when unloaded or when the device is subjected to shock vibration or strain. To avoid such slipping the rope is provided with means for preserving the knots in a taut condition I have found that sleeves such as indicated at 13, 14, 15 and 16 when formed of resilient material such as rubber or the like and passed over the knots enable the latter to resist disintegration and to preserve their tautness whatever the nature of the vibration shock or varying strains to which the rope may be subjected.

As will be seen in Fig. 4 which is a detail view of the knot 7 the "bowline" knot is made by first forming the loop 17 and the loop 2 then placing the rope about the aforesaid loop 17 to form the encircling coil 18 and lastly drawing the end of the coil through the loop 17.

The resilient and extensible element 3 is composed of strands of rubber adapted to be placed in tension upon the application of the load. The several strands constituting the resilient and extensible elements are twisted together in opposing spirals as shown in Fig. 3 the several strands being of uniform length and the arrangement on the loop 2 being such that the strain when the element is subjected to tension is borne equally by all and each of the strands. In the example illustrated it will be observed that the element is composed of two series of five strands whereof the twist or spiral is in opposite directions. The disposition of the respective strands *a*, *b*, *c*, *d* and *e*, is such that say the strand *a* which in the upper loop 2 assumes the outermost and uppermost position in regard to the curve of the loop if traced through the spiral will be found to assume the innermost or approximately central position of the curve of the lower loop 2. The strand *b* which is disposed in the next outermost position in regard to the upper loop 2 similarly assumes the next innermost position in regard to the curve of the lower loop 2. The relative positions of the stands *c* and *d* may similarly be traced and the strand *e* which occupies the innermost position in regard to the curve of the upper loop 2 assumes the outermost position in regard to the curve of the lower loop 2. In Fig. 3 the strands on the left of the figure are shown as spread out toward the loops 2, 2 in order to clearly illustrate the above described arrangement whereby the individual strands are not shortened; the natural or normal twist or attitude of the several strands relatively to each other is shown on the right hand side of the figure and it will be readily seen that the strain is distributed equally upon each spiral and upon all of the strands.

I claim:—

1. The combination, with a parachute, of a safety spring sling or suspension device comprising an inextensible, flexible element extending in a single unitary piece from the parachute to the passenger's harness, a plurality of springs normally of less length than said inextensible element, said springs being so constructed as to prevent spinning and twisting when weight is applied, attaching means on the inextensible element to which the opposite ends of the springs are connected, and means directly engaged with said attaching means to prevent displacement thereof.

2. The combination, with a parachute, of a safety spring sling or suspension device comprising a plurality of springs so constructed as to prevent spinning and twisting when weight is applied, an inextensible, flexible element extending in a single unitary piece from the parachute to the passenger's harness and having a length greater than the length of the springs when at rest, said inextensible element having portions thereof looped to form attaching means for the opposite ends of the springs, and means structurally separate from said looped portions directly engaged with the same to prevent them from becoming displaced.

3. The combination with a parachute of a safety spring sling or suspension device comprising a plurality of springs so constructed as to prevent spinning and twisting when weight is applied, means for mounting the said springs between the parachute and the passenger, a continuous inextensible flexible element constructed of plaited or braided rope of greater length than said springs at rest, eyes or loops formed by knotting said element, and sleeves of resilient material inclosing said knots.

4. The combination with a parachute of a safety spring sling or suspension device comprising a resilient and extensible element composed of a plurality of strands of rubber arranged in opposing spirals to cause the strain to be borne equally by each spiral and by all of the strands, means for mounting the said element between the parachute and the passenger, a continuous inextensible flexible element constructed of plaited or braided rope of greater length than said resilient and extensible element at rest, eyes or loops formed by knotting said inextensible element and sleeves of resilient material inclosing said knots.

5. The combination with a parachute of a safety spring sling or suspension device comprising a plurality of springs composed of strands of rubber arranged in opposing spirals, eyes or loops on said springs for mounting the same between the parachute and the passenger, a continuous inextensible flexible element constructed of plaited or braided rope of greater length than said springs at rest, eyes or loops formed by knotting said element to receive said springs and sleeves of resilient material inclosing said knots.

6. The combination with a parachute of a safety spring sling or suspension device comprising a plurality of springs composed of strands of rubber arranged in opposing spirals, a continuous inextensible flexible element constructed of plaited or braided rope of greater length than said springs at rest, means for mounting said springs on the said inextensible element so that the strain is borne equally by each spiral and by all of the strands, knots in said inextensible element and a safety loop formed in said inextensible element.

E. R. CALTHROP.